United States Patent [19]
Kanbara et al.

[11] 3,901,490
[45] Aug. 26, 1975

[54] CUTOFF SYSTEM FOR SOLID AND GAS PROVIDED ON A REDUCING FURNACE OF CONTINUOUS OPERATION

[75] Inventors: Kenjiro Kanbara, Sakai; Satoru Miyasita, Himeji, both of Japan

[73] Assignee: Nippon Steel Corporation, Tokyo, Japan

[22] Filed: June 26, 1974

[21] Appl. No.: 483,296

[30] Foreign Application Priority Data
July 12, 1973  Japan.............................. 48-78835

[52] U.S. Cl................................. 266/20; 266/25
[51] Int. Cl................................... C21b 1/00
[58] Field of Search.............................. 75/33–37; 214/18 R, 35 R; 266/20, 24, 25, 29

[56] References Cited
UNITED STATES PATENTS
2,670,946   3/1954   Royster.............................. 266/20
2,806,783   9/1957   Tschop et al..................... 266/25 X

*Primary Examiner*—Gerald A. Dost
*Attorney, Agent, or Firm*—Toren, McGeady and Stanger

[57] ABSTRACT

Treating vessels for desulfurization and cooling are connected in series through exhaust pipe lines for reduced iron provided in a plurality of parallel lines on the bottom portion of a reducing furnace, and sealing valves of heat resisting construction are respectively provided in pipe lines on receiving side of high temperature reduced iron of both said treating vessels, while sealing valves having practically same construction as said sealing valves but having no cooling mechanism are provided on exhausting side of cooled reduced iron of said treating vessel for cooling, thus forming a cutoff system for solid and gas provided on a reducing furnace of continuous operation.

3 Claims, 5 Drawing Figures

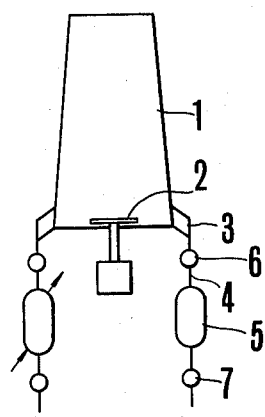
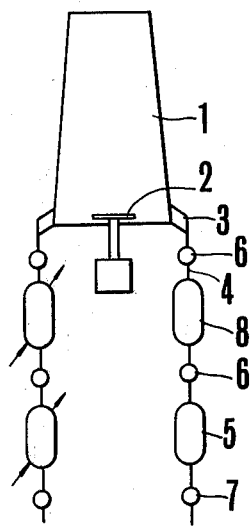
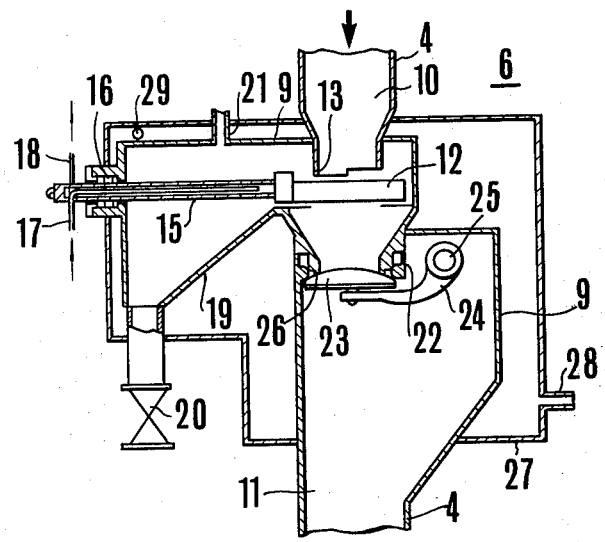
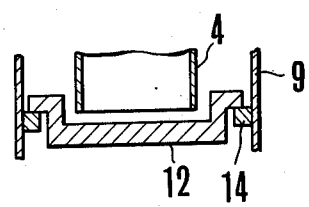
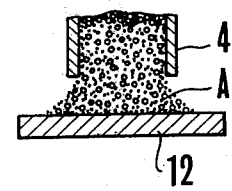

CUTOFF SYSTEM FOR SOLID AND GAS PROVIDED ON A REDUCING FURNACE OF CONTINUOUS OPERATION

BACKGROUND OF THE INVENTION:

This invention relates to a treating device, wherein pellet-shaped reduced iron under high temperature continuously manufactured in a reducing furnace is treated in treating vessels which are provided in parallel.

It is understood that the pellet-shaped reduced iron in this invention means the pellet-shaped reduced iron produced in such a manner that for instance, pellet-shaped iron oxide within a range of grain size 5 to 50 mm, such as iron oxide pellet obtained by pelletizing treatment of iron oxide impalpable powder or granular iron ore obtained by grain sorting treatment of iron ore into predetermined grain size or the like, is charged from the upper portion of a reducing furnace comprising, for instance, a shaft furnace, and is reduced by high temperature reducing gas of, for instance, 700°to 900°C, and is continuously cut out under high temperature from the bottom portion of the furnace.

And, the treating furnace in this invention means a vessel for cooling the pellet shaped reduced iron under high temperature to 100°C and below, more concretely, for instance, a cooling vessel in which, inert or nonoxidizing cooling gas is circulated, or a desulfurizing vessel of pellet-shaped reduced iron under high temperautre, more concretely a desulfurizing vessel in which within a reducing furnace, a vessel that receives reduced iron vulcanized by reducing gas is circulated with high temperature reducing gas, of which main part is $H_2$, to effect desulfurizing treatment, or a recarburizing vessel of pellet-shaped reduced iron under high temperature, more concretely a recarburizing vessel in which within a vessel that received pellet-shaped reduced iron is circulated with high temperature reducing gas, of which main part is CO, to effect recarburizing treatment, or other treatment vessels to carry out required treatments or the like.

As above described, the pellet-shaped reduced iron continuously cut out from the reducing furnace is received in treating vessels of limited capacity. So that, a plurality of treating vessels should be used by changing them over, and in this case, following matters are required in the treating vessel system.

Namely, the atmosphere within the treating vessel should not practically flow into the reducing furnace. The open air and other oxidizing atmosphere, which have bad influence on the reduced iron, should not flow into the treating vessels.

But, the pellet-shaped reduced iron which are transferred from the reducing furnace to the treating vessels are under high temperature, for instance, 700 to 900°C or somewhat lower than these.

And, in the reducing furnace, impalpable powder such as reduced iron and the like are produced, so that the flow of substance mixed with reducing gas must be cut off, however, no such a treating means has hitherto been found that was provided with a sealing valve which may be carried out in a satisfactory condition.

As a usually known cut-off valve for solid and gas mixture belonging to this kind of sealing valve, it is disclosed, for instance, in Japanese Pat. No. 198,377. This is a cut-off device, in which a plurality of dampers which ascend and descend are provided on a sloping passage, a gas inlet for purging is respectively provided on each partitioned area, and opening and closing operation of each damper is effected in a predetermined routine.

Said kind of cut-off valve is also disclosed in Japanese Pat. Publication No. Sho 31-4135, as a gate device, wherein a plurality of chambers having exclusion flaps are arranged above and below each other and opening and closing operations of the flaps of each chamber are effected in a predetermined routine.

Said kind of cut-off valve is further disclosed in Japanese Patent Publication No. Sho 43-19428, as a device provided with a horizontal type rotary drum which has an opening cooperating with the opening of exhaust port on the peripheral face of the drum, which is rotatable in both of normal and reverse directions, and a butterfly type damper on the lower end of the exhaust port.

In said Japanese Pat. No. 198 377, there are provided with dampers which ascend and descend to a sloping passage, however, it is extremely difficult to cut off gas by means of the damper. Namely, if granular substance is put between the passage and the damper, gas cannot be cut off any more.

In said Japanese Pat. Publication No. Sho 31-4135, the flap 4 is alway contacted with grain, so that it will easily wear and the life of airtight function is short.

In said Japanese Patent Publication No. Sho 43-19428, the horizontal type rotary drum having airtight function will wear and in some cases it will deform, because granular substance falls on the outer peripheral face of the drum at the time of cut-off, and the life of airtight is short.

Thus, usual cut-off devices have difficulties in their life in view of airtightness.

The object of this invention is to provide a treating device system for pellet-shaped reduced iron to be able to bring satisfactory result for said requirement, which device being provided with a sealing valve that will considerably extend the endurance life of airtightness, which could not be solved by any of usual cut-off device.

Summary of the Invention:

The cutoff system for solid and gas provided on a reducing furnace of continuous operation according to this invention consists in a treating device for pellet-shaped reduced iron, characterized in that one or more treating vessels are provided on the way of exhaust pipe lines for reduced iron which are arranged in parallel on the bottom portion of a reducing furnace, and on high temperature side of said pipe lines, sealing valves respectively provided with a mechanism for cutting off the grain by means of reciprocating slide plate on upper stage thereof, a cut-off mechanism for atmospheric gas by means of a valve seat provided with gas sealing groove and a turning valve body and a cooling mechanism on lower stage thereof, and on low temperature side of said pipe lines, sealing valves respectively provided with a mechanism for cutting off the grain by means of reciprocating slide plate on upper stage thereof and a cut-off mechanism for atmospheric gas by means of a valve seat provided with sealing packing and a turning valve body on lower stage thereof.

Said cut-off valves for solid and gas are provided on pipe lines or treating vessels (desulfurizing vessel, cooling vessel), through which the grain, such as iron oxide pellet of 5 to 50 mm grain diameter, reduced iron pellet, grain sorted iron ore or other ores, and gas for treating said grain, such as reducing gas and the like will flow under vertical state, thus their airtight cut-off function may be effectively displayed. And, the construciton of said cut-off valves is such that the slide plate is reciprocatably provided directly under the upper opening within the valve box on which upper and lower ends are provided with openings for connecting with pipe lines, and on retreat side of said slide plate, a dust hopper is arranged, on which a cut-off valve is mounted under the slide plate, and a gas spouting port is opened on the upper portion of said dust hopper, and above said lower opening a spherical valve body to be engaged with the valve seat is rotatably arranged.

Brief Description of the Drawings:

FIG. 1 and FIG. 2 are schematic explanatory drawings, showing features of treating device of pellet-shaped reduced iron according to this invention.

FIG. 3 is an explanatory drawing in section of a sealing valve of heat resisting construction.

FIG. 4 is an explanatory drawing in section viewed from slide direction of the slide plate.

FIG. 5 is an explanatory drawing in section, showing the state that pellet is cut off by the slide plate.

Description of the Preferred Embodiment:

This invention will be concretely explained in connection with the accompanying drawings, as follows.

FIG. 1 and FIG. 2 are schematic explanatory drawings of a treating device of pellet-shaped reduced iron according to this invention.

On the bottom portion of a shaft furnace 1, a cutting out device such as a turn table 2 is provided, and pellet-shaped reduced iron within the furnace 1 is continuously cut out by definite quantity. Cut out pellet-shaped reduced iron under high temperature passes through an exhaust port 3 and transfers into a treating device system.

In this case, the quantity of pellet-shaped reduced iron which may be received in the treating device of one series is limited in predetermined value, so that plural series (two series in this example) of treating device are provided to correspond to the continuous cut out from the furnace 1 of vertical type, thus the aimed treatment is effected by changing over each series alternately for use.

FIG. 1 shows an example, wherein exhaust pipe lines 4 for reduced iron are respectively provided on two exhaust ports provided on the bottom portion of the reducing furnace 1 of vertical type, and a cooling vessel 5 is provided on the way of this pipe line 4, and on inlet side of this cooling vessel 5, namely,, on high temperature side pipe line 4, a sealing valve 6 of heat resisting construction is provided, and on outlet side of the cooling vessel 5, namely on low temperature side pipe line 4, a sealing valve 7 is provided.

In said cooling vessel 5, for instance, nitrogen gas is circulated, and pellet-shaped reduced iron of, for instance, more than 500°C is cooled below, for instance, 100°C.

Said cooling treatment may be preferably effected in a possible temperature range and in a short time, and to accelerate the cooling treatment, means for stirring the pellet-shaped reduced iron may be used by providing a stirrer within the cooling vessel 5, and cooling means for outside wall of the cooling vessel 5 may be concurrently used.

FIG. 2 is one of examples of series arrangement of plural treating vessels, wherein an exhaust pipe line 4 for reduced iron is respectively provided on two exhaust ports which are provided on the bottom portion of the reducing furnace 1, and on the way of this pipe line 4, a desulfurizing vessel 8 and a cooling vessel 5 are provided from the upper part thereof, and on inlet side and outlet side of this desulfurizing vessel 8 and on inlet side of the cooling vessel 5, namely, on high temperature side pipe line 4, a sealing valve 6 of heat resisting construction is provided, and on outlet side of the cooling vessel 5, namely, on low temperature side pipe line 4, a sealing valve 7 is provided.

Within said desulfurizing vessel 8, for instance, high temperature reducing gas of 700°C to 900°C, of which main constituent being hydrogen, is circulated, thus removing sulfur which is transferred from reduced gas into pellet-shaped reduced iron within the reducing furnace 1 of vertical type.

In said cooling vessel 5, high temperature pellet-shaped reduced iron subjected to desulfurizing treatment is treated for cooling below 100°C as above described.

The important matter in said treating device for pellet-shaped reduced iron is firstly that the plural treating devices system provided in parallel may be changed over at predetermined intervals corresponding to the reducing furnace of vertical type operated continuously, and the transfer of pellet-shaped reduced iron may be cut off before and after each treating vessel, and at the same time, sealing valves capable of cutting off the atmospheric gas may be used.

Also, it is important from the viewpoint of continuity of operation that the life of these sealing valves are long.

And, in this invention, such a sealing valve as shown in FIG. 3 is used as a sealing valve which will possess said important matters.

FIG. 3 shows an example of sealing valve 6 of heat resisting construction.

As is shown, openings 10 and 11 are provided on upper and lower ends of a valve box 9. These openings 10 and 11 are arranged practically in alignment and each of them is respectively connected with an upstream side pipe line 4 and a downstream side pipe line 4, or connected with exhaust port of a vessel which is receiving same gas. The tip of said upstream side pipe line 4 forms a cylindrical portion and projectingly arranged within the valve box 9. This cylindrical portion may be formed with the extension of pipe line 4 which is connected with the opening 10. Directly under the opening of this pipe line 4, a slide plate 12 is provided capable of traversing the center line of said pipe line 4. Between the upper face of this slide plate 12 and the lower face of said pipe line 4, an interval which is larger than the diameter of grain, such as the pellet, is set, thereby the sliding of the slide plate 12 may be smoothly effected. Usually, in such a slide gate, it is considered as common use that the interval is set in a state smaller the diameter of grain, however, according to the experiments made by the inventors, it is confirmed that very smooth sliding may be effected by making the interval larger than the diameter of grain in question.

A scraper 13 is provided near or on the pipe line 4 on said slide plate 12. As will be stated below, said scraper 13 will slip off the pellet on said slide plate 12 by making use of retreating motion of the slide plate 12. Between the lower end of the scraper 13 and the upper face of the slide plate 12, an interval smaller than the diameter of pellet is set.

In the example shown in FIG. 3, said scraper 13 is provided on semi-peripheral portion of the lower end of the pipe line 4 (retreat side of the slide plate 12). If the scraper 13 covers whole periphery of the lower end of the pipe line 4, said portion, where larger interval than the diameter of pellet is set, will be canceled and sliding of the slide plate 12 will become difficult.

FIG. 4 is a section viewed from slide direction of the slide plate 12, wherein both ends of the slide plate 12 are supported on guides 14 provided on the valve box 9 and the plate will effect interfacial sliding.

Said guides 14 are provided not on whole length of both edges of the slide plate 12. When the slide plate 12 is slidden, the tips of both ends thereof will slip off any dust which will accumulate on the guides 14.

Said slide plate 12 is connected with a driving device, for instance, a hydraulic cylinder (not shown), through a shaft 15. And, when said driving device is operated, the slide plate 12 will move forward or backward to shut off the lower end of the pipe line 4 or to retreat therefrom.

FIG. 5 is a section, showing a state that pellet is cut off by the slide plate 12. On the slide plate 12, pellet A is piled up with its angle of repose, and the slide plate 12 has enough area to support said pellet A and is formed into channel-shape, so that the pellet A would never be slipped off from the slide plate 12 in its cut-off state.

The portion, where said shaft 15 passes through the valve box 9, is sealed by sealing material 16 to prevent leakage of atmosphere within the valve box 9.

Since this sealing valve 6 is used for high temperature, the shaft 15 is constructed to be cooled. Namely, the shaft 10 is formed into double pipes to be filled with water from a supply pipe 17 and discharge the water from a discharge pipe 18 to cool the shaft 15, thereby to cool the slide plate 12 and the sealing material indirectly.

As above mentioned, the slide plate 12 will be moved forward and backward along the guide 14 by operating the driving device (not shown). In this case, if pellet A and any dust comprising fine grain produced by mutual friction of these pellet A are respectively exist on the slide plate 12, these are swept off by means of said scraper 13 to flow out from the lower opening 11.

On the other hand, a part of said dust is left on the slide plate 12, and when the slide plate 12 stopped on the retreat side, it is blown up by gas flow coming from the side of upper opening 10 and is piled up on the retreat side within the valve box 9, thereby the retreat of the slide plate 12 will become impossible.

And, a dust hopper 19 is provided within the valve box 9, on the retreat side of the slide plate 12 and below the moving position thereof. On the lower end of this dust hopper 19, a valve 20 is provided to cut off airtightly.

As will be described under, fine grain and gas will pass through the portion of this valve 20, but its passage of flow is relatively small, so that it may be airtightly cut off by the valve 20, such as a ball valve or the like.

Above said dust hopper 19, a spouting port 21 for inert gas is provided.

And, when predetermined quantity of dust accumulates within the dust hopper 19 by several times of sliding of the slide plate 12, nitrogen gas having higher pressure than the atmospheric pressure within the valve box 9 is blown in from the spouting port 21 to raise the atmospheric pressure of the portion of dust hopper 19 sufficiently, then the valve 20 is opened to press out the dust under a state that the inflow of gas from the side of said opening 10 is prevented to the utmost.

The operation of pressing out of said dust will be effected intermittently with predetermined intervals.

Above the lower opening 11 of the valve box 9, a flap valve comprising a valve seat 22 and a valve body 23 formed into a sphere, made of metallic material respectively.

A part of said valve seat 22 constitutes a part of the valve box 9. And, the valve body 23 is supported by a shaft 25 rotatably within the valve box 9 through an arm 24.

A part of said shaft 25 airtightly projects out of the valve box 9 and connected with a known driving device (not shown) which rotates said shaft 25.

The state of mounting of said flap valve is such that the spherical face of the valve body 23 will engage with the lower face of the valve seat 22. And, dust and the like will not stick to or accumulate on the engaging portion of the valve seat 22 and the valve body 23, and falling pellet A will not contact with the engaging portion of the valve seat 22 and the valve body 23 which is turned and retreated.

As mentioned above, as a flap valve in the sealing valve 6 for high temperature, if the engagement between the valve seat 22 and the valve body 23, i.e. the engagement of metal with metal, their sealing function is not sure within the atmosphere including dust and the like floating therein, as is well known. And, now in the engaging portion of the valve seat 22, a gas sealing groove 26 is provided in its peripheral direction. In this gas sealing groove 26, inert gas, such as nitrogen gas, is supplied.

The pressure of inert gas to be supplied is set at somewhat higher pressure than the pressure within the valve box 9 above the valve seat 22.

When said valve seat 22 and valve body 23 are engaged, the gas sealing groove 26 will form gas curtain in a state that the groove is covered by the valve body 23, so that gas sealing may be effected surely. And, during the engagement of the valve seat 22 and the valve body 23, inert gas is always supplied, so that the engaged faces of the valve seat 22 and the valve body 23 are cooled by inert gas which is flowing out. And, when the valve body 23 comes near to the valve seat 22, spherical surface of the valve body 23 will be cleaned up by the flow of inert gas under predetermined pressure.

When the valve seat 22 and the valve body 23 are in a complete contact and thus sealing is maintained, the supply of the sealing gas may be stopped.

As mentioned above, the sealing valve 6, which is provided with the cut-off mechanism for pellet comprising the slide plate 12 and the exhaust mechanism for dust on the upper portion within the valve box 9, and the cut-off mechanism for gas comprising the flap valve on the lower portion of the valve box, is provided with a peripheral wall 27 on outer periphery of the valve box 9, and cooling fluid is supplied from a pipe 28 to the space between the peripheral wall 27 and the valve box 9, and is discharged from a pipe 29. As cooling fluid to be circulated, water, vapor, air and other cooling medium are used in compliance with the cooling capacity to be required.

In the next place, the construction of a sealing valve 7, which is to be provided on the way of the low temperature side pipe line 4, will be explained. Since the fundamental construction of this sealing valve 7 is substantially same as that of the sealing valve 6 for high temperature,, only the points of difference between them will be explained.

Firstly, the shaft 15 connected with the slide plate 12 is not necessary to be cooled. So that, it is formed with an ordinary shaft of rod-shape or pipe-shape.

Next, the gas sealing groove 26 of the valve seat 22 is not necessary in particular. Instead of the gas sealing groove 26, mere groove (not shown) is provided at the same position in peripheral direction, in which groove a sealing packing made of elastic substance, such as rubber and the like, is filled, thereby the cutting off of the atmospheric gas may be effected almost surely.

And, the peripheral wall 27 for cooling the valve box 9 is not necessary.

Excepting above three points of difference on the construction, all of the mechanisms to be possessed as a sealing valve 7, namely the cut-off mechanism for pellet comprising the slide plate 12 and the dust exhausting mechanism on the upper portion within the valve box 9, and the cut-off mechanism for gas comprising the flap valve on the lower portion thereof, are identical.

In the next place, the operations of said sealing valves 6 and 7 will be explained on the basis of the sealing valve 6.

In the first place, when the sealing valve 6 is opened, the shaft 25 is rotated to turn the valve body 23 and to retreat from the falling passage of pellet A, and successively the slide plate 12 is moved to the side of retreat, then the sealing valve 6 is opened, thus pellet will move from the upper opening 10 towards the lower opening 11. By the movement of said slide plate 12, pellet A which is accumulated on the slide plate 12 is swept off by the scraper 13 to pass through the lower opening 3.

On the other hand, the dust comprising fine grain remained on the slide plate 12 is swept off on the side of retreat of the slide plate 12 to accumulate within the dust hopper 19.

In the next place, when the sealing valve 6 is closed, the slide 12 is advanced and is positioned directly under the upper opening 10 to cut off falling pellet A and successively the shaft 25 is rotated to turn the valve body 23 and to engage the same with the valve seat 22. At this time, nitrogen gas is being spouted from the gas sealing groove 26, and when the valve seat 22 and the valve body are engaged, the atmospheric gas flowing from the high pressure side to the low pressure side is cut off from its flow.

When opening and closing operations of said sealing valve 6 are repeated several times, the dust comprising fine grain which is accumulated within the dust hopper 19 will increase, so that nitrogen gas is spouted from the gas spouting port 21 at a suitable time to make the pressure within the valve box 9 of the dust hopper 19 sufficiently higher, thus preventing the entry of the atmospheric gas from the up stream side to the utmost and opening the valve 20 to press out the dust.

Cooling water is supplied from the pipe 28 provided on the peripheral wall 27 of said sealing valve 6 and is discharged from the pipe 29, thereby the whole of sealing valve 6 is cooled.

And, by supplying cooling water from the supply pipe 17 of the shaft 15 and discharging the same from the discharge pipe 18, the slide plate 12 and the sealing material 16 are respectively and indirectly cooled.

In the next place, the operation of the treating device of pellet-shaped reduced iron, which device provided with said specific sealing valves 6 and 7, will be explained on the basis of FIG. 1.

First, the pellet-shaped reduced iron continuously cut out from the reducing furnace 1 is supplied to a specific treating device system, by opening one of two sealing valves 6 which are provided on the high temperature side pipe lines 4 of the treating device arranged in parallel and by closing another of said valves.

Within the cooling vessel 5 which is to be supplied with high temperature pellet-shaped reduced iron, inert gas is preliminarily introduced and oxidizing gas is excluded.

When pellet-shaped reduced iron of predetermined quantity is received in the cooling vessel 5, the sealing valve 6 will close and the sealing valve 6 of another treating device system will open.

Within the cooling vessel 5, inert gas for cooling is circulated and high temperature pellet-shaped reduced iron is cooled below 100°C. When the cooling treatment is finished,, the sealing valve 7 opens to discharge the pellet-shaped reduced iron.

Total time of said cooling time and discharge time of the reduced iron is practically equal to or shorter than the time required to receive the predetermined quantity in said another treating device system.

By repeating above mentioned operations, the cooling treatment of pellet-shaped reduced iron may be continuously effected corresponding to the continuous operation of the reducing furnace 1.

Above explanation is made about the examples of treating device of two series, however, when the treating device comprises three series, cooling treatment having more time may be effected.

As mentioned above, according to the device of this invention, the treatment of high temperature pellet-shaped reduced iron may be effected corresponding to the continuous operation of the reducing furnace.

And, in the device of this invention, the sealing valve 7, which is provided with the pellet cut-off mechanism, dust exhausting mechanism and gas cut-off mechanism, and the sealing valve 6, which has the cooling mechanism besides said mechanisms, are used, so that the cutting off of pellet and gas of the treating device system may be effected surely as well as for a long time.

And, the entry of other atomospheric gas into the reducing furnace may be made minimum or none, and the entry of the open air (oxidizing gas) into the treating vessel may be almost perfectly prevented.

What is claimed is:

1. A cut-off system for solids and gases for a continuous operation reducing furnace, comprising:
    exhaust pipe lines for reduced iron grain which are arranged in parallel on the bottom portion of a reducing furnace;

at least one treating vessel being provided in said exhaust pipe lines;

sealing valves being respectively provided on the high temperature side of said lines with means for cutting off the reduced iron grain, said means including a reciprocating slide plate on an upper stage of said valves, and a cut-off mechanism for atmospheric gas including a valve seat provided with a gas sealing groove and a turning valve body and further including a cooling mechanism on a lower stage of said valves; and sealing valves also being provided on the low temperature side of said pipe lines, said sealing valves being respectively provided with means for cutting off the reduced iron grain, said means including a reciprocating slide plate on an upper stage of said valves and a cut-off mechanism for atmospheric gas including a valve seat provided with sealing packing and a turning body on a lower stage of said valves.

2. A system for solids and gases according to claim 1, wherein a dust hopper having a cut-off valve is provided below the retreating side of the slide plate, and a gas spouting port is provided above said dust hopper, and wherein a valve seat and a turning valve body are formed as a spherical valve body.

3. A cutoff system for solids and gases according to claim 1, wherein the interval between the slide plate and the lower end of the pipe line is made larger than the diameter of grain to be cut off.

* * * * *